(12) United States Patent
Naito et al.

(10) Patent No.: US 9,236,628 B2
(45) Date of Patent: Jan. 12, 2016

(54) FUEL CELL SYSTEM

(71) Applicant: HONDA MOTOR CO., LTD., Minato-Ku, Tokyo (JP)

(72) Inventors: Hideharu Naito, Utsunomiya (JP); Yusuke Nara, Utsunomiya (JP); Nariyuki Yoshinaga, Utsunomiya (JP); Hidetada Kojima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 14/297,961

(22) Filed: Jun. 6, 2014

(65) Prior Publication Data

US 2014/0363755 A1 Dec. 11, 2014

(30) Foreign Application Priority Data

Jun. 10, 2013 (JP) ................... 2013-121720
May 19, 2014 (JP) ................... 2014-103218

(51) Int. Cl.
| | | |
|---|---|---|
| *H01M 2/04* | (2006.01) | |
| *H01M 8/24* | (2006.01) | |
| *B60L 11/18* | (2006.01) | |
| *H01M 8/10* | (2006.01) | |

(52) U.S. Cl.
CPC ......... *H01M 8/2485* (2013.01); *B60L 11/1883* (2013.01); *B60L 11/1892* (2013.01); *H01M 8/248* (2013.01); *H01M 2008/1095* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 2005/0106446 A1* | 5/2005 | Sato ................. | H01M 8/04029 429/414 |
| 2008/0156554 A1* | 7/2008 | Noto ................. | H01M 8/04552 180/65.31 |
| 2008/0311457 A1* | 12/2008 | Andreas-Schott .... | H01M 8/241 429/513 |

FOREIGN PATENT DOCUMENTS

JP 3671864 B2 7/2005

* cited by examiner

*Primary Examiner* — Patrick Ryan
*Assistant Examiner* — Wyatt McConnell
(74) *Attorney, Agent, or Firm* — Carrier Blackman & Associates, P.C.; Joseph P. Carrier; William D. Blackman

(57) ABSTRACT

A group of fuel gas system devices are provided at a first end plate of a fuel cell system through a block member. A cover member is provided at the first end plate to cover the group of the fuel gas system devices. Support rod members are provided at the first end plate. The support rod members protrude outward in a stacking direction to support the cover member at the front ends of the support rod members.

4 Claims, 7 Drawing Sheets

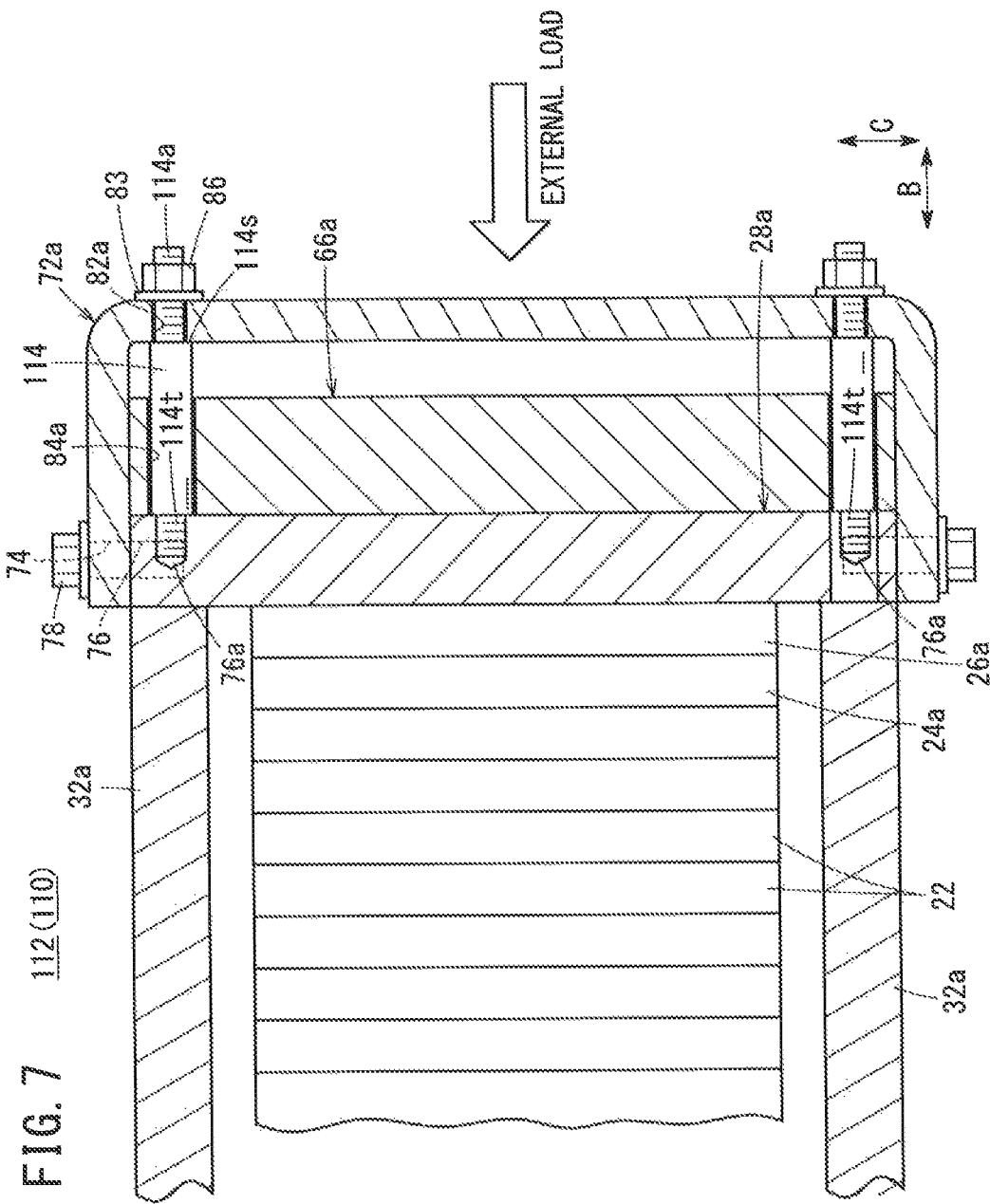

FUEL CELL SYSTEM

CROSS-REFERENCE TO RELATED APPLICATIONS

This application is based upon and claims the benefit of priority from Japanese Patent Applications No. 2013-121720 filed on Jun. 10, 2013 and No. 2014-103218 filed on May 19, 2014, the contents all of which are incorporated herein by reference.

BACKGROUND OF THE INVENTION

1. Field of the Invention

The present invention relates to a fuel cell system including a fuel cell stack formed by stacking a plurality of fuel cells in a stacking direction and end plates provided at both ends of the fuel cell stack in the stacking direction. Each of the fuel cells generates electricity by electrochemical reactions of a fuel gas and an oxygen-containing gas.

2. Description of the Related Art

For example, a solid polymer electrolyte fuel cell employs an electrolyte membrane. The electrolyte membrane is a polymer ion exchange membrane. In the fuel cell, the electrolyte membrane is interposed between an anode and a cathode to form a membrane electrode assembly (MEA). The membrane electrode assembly is sandwiched between a pair separators to form a power generation cell. In use, in the fuel cell, generally, a predetermined number of power generation cells are stacked together to form a fuel cell stack, e.g., mounted in a vehicle.

In the case where the fuel cell stack is used, in particular, in a vehicle as an in-vehicle fuel cell stack, it is desired to provide components such as fuel gas (e.g., hydrogen gas) system devices and oxygen-containing gas (e.g., air) system devices in a small space efficiently. In this case, it is necessary to protect the fuel gas system device preferentially against possible collisions of the vehicle.

For this purpose, for example, piping structure of a fuel cell disclosed in Japanese Patent No. 3671864 is known. In the piping structure, the stack is placed in a casing to mount the fuel cell stack in a vehicle. In the casing, fuel gas pipes, oxygen-containing gas pipes, and coolant pipes connected to the stack are provided. In comparison with the oxygen-containing gas pipes and the coolant pipes, inlet side fuel gas pipe and outlet side fuel gas pipes as the fuel gas pipes are provided closely to the stack, at positions closest to the stack in the stacking direction of cells.

In the piping structure, coolant pipes for supplying a coolant into or discharging the coolant from a coolant manifold in the fuel cell stack, and gas pipes for supplying reactant gases into or discharging the reactant gases from gas manifolds in the fuel cell stack are connected to an end plate provided at one end of the fuel cell stack. The gas pipes include fuel gas pipes for supplying a fuel gas into or discharging the fuel gas from a fuel gas manifold in the fuel cell stack, and oxygen-containing gas pipes for supplying an oxygen-containing gas into or discharging the oxygen-containing gas from an oxygen-containing gas manifold in the fuel cell stack. Further, among the fuel gas pipes, the oxygen-containing gas pipes, and the coolant pipes, the fuel gas pipes are provided at the innermost positions of the vehicle.

SUMMARY OF THE INVENTION

In the technique, the above fuel cell stack is placed in the casing, and the fuel gas pipes, the oxygen-containing gas pipes, and the coolant pipes attached to one of the end plates are covered by the case. However, when a large external load is applied to the casing due to a collision of the vehicle, the casing may be deformed toward the end plate. At this time, the coolant pipes and the oxygen-containing gas pipes may be damaged by the deformed casing. Further, the fuel gas pipes may be damaged undesirably.

As a possible approach to address the problem, it has been suggested to improve the rigidity of the casing itself. However, in this approach, the casing itself becomes thick, heavy, and large. Therefore, the efficiency of handling the casing becomes low, and the casing is not economical.

The present invention has been made to solve the problem of this type, and an object of the present invention is to provide a fuel cell system having lightweight and compact structure in which the external load can be received reliably, and damages of, in particular, fuel gas system devices can be suppressed as much as possible.

The present invention relates to a fuel cell system including a fuel cell stack formed by stacking a plurality of fuel cells in a stacking direction and end plates provided at both ends of the fuel cell stack in the stacking direction. Each of the fuel cells generates electricity by electrochemical reactions of a fuel gas and an oxygen-containing gas.

In this fuel cell system, a plurality of fuel gas system devices are provided at one of end plates, and a cover member is provided to cover the fuel gas system devices. A support rod member is provided at the one of the end plates, and the support rod member protrudes outward in the stacking direction to support the cover member at a front end of the support rod member.

In the present invention, the cover member covering the fuel gas system devices is supported by the front end of the support rod member provided at the end plate to protrude in the stacking direction. In the structure, when an external load is applied to the cover member, the external load is transmitted to the end plate through the support rod member.

Therefore, it becomes possible to suppress deformation of the cover member suitably. With the lightweight and compact structure, it is possible to reliably receive the external road. Accordingly, in particular, it becomes possible to suppress damages of the fuel gas system devices as much as possible.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is view showing one end of the fuel cell stack.

DESCRIPTION OF THE PREFERRED EMBODIMENTS

Figure 1:
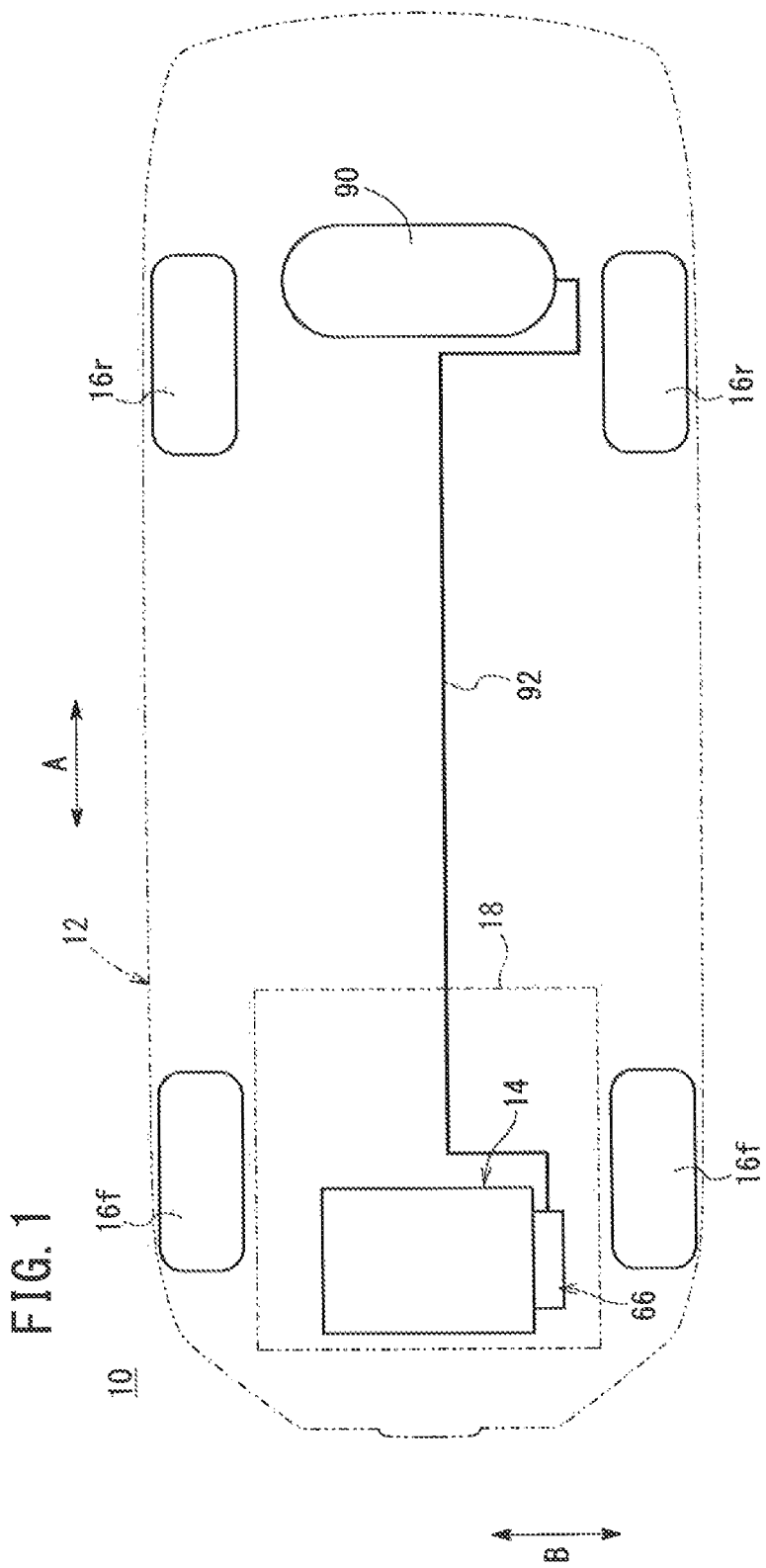
FIG. 1 is a diagram schematically showing the overall structure of a fuel cell vehicle equipped with a fuel cell system according to a first embodiment of the present invention.

As shown in FIG. 1, a fuel cell system 10 according to a first embodiment of the present invention is an in-vehicle fuel cell system mounted in a fuel cell vehicle 12 such as a fuel cell electric automobile. In the fuel cell system 10, a fuel cell stack 14 is provided in a motor room 18 adjacent to front wheels 16f, 16f. A hydrogen tank 90 described later is provided between rear wheels 16r, 16r.

Figure 2:
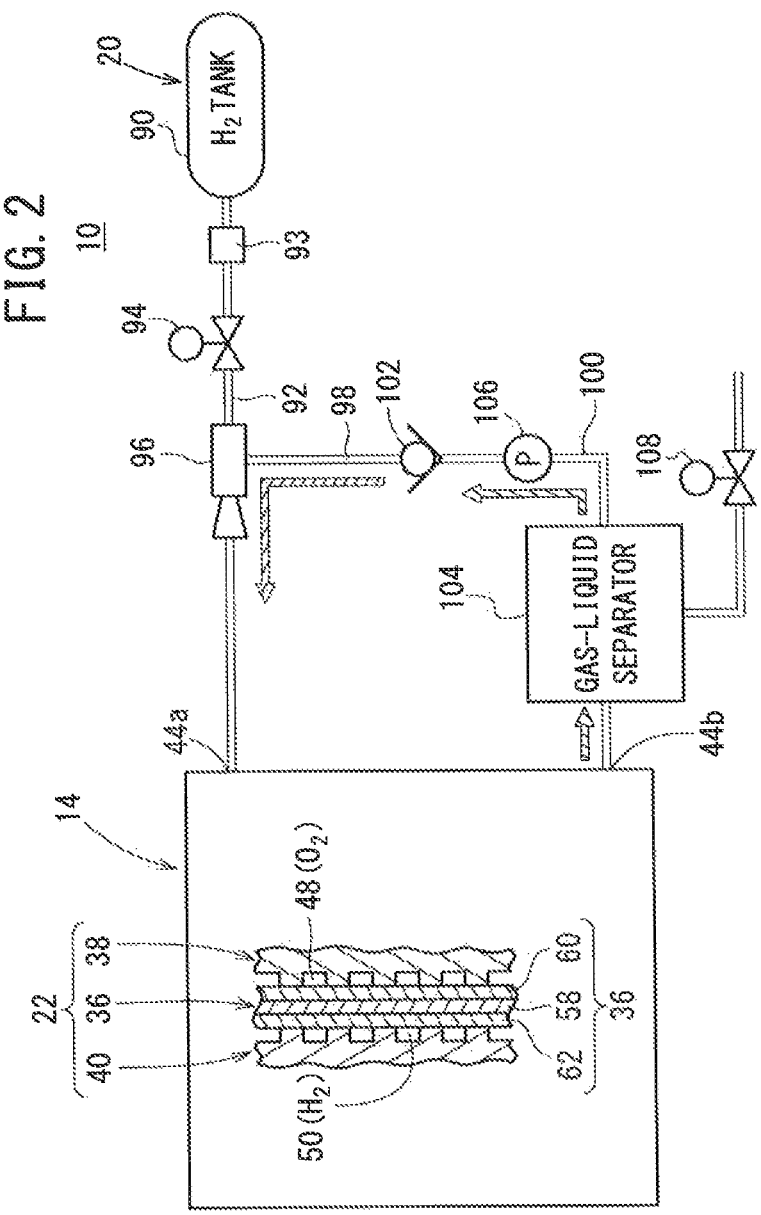
FIG. 2 is a diagram schematically showing structure of the fuel cell system.

As shown in FIG. 2, the fuel cell system 10 includes the fuel cell stack 14 and a fuel gas supply apparatus 20 for supplying a fuel gas to the fuel cell stack 14. Though not shown, the fuel cell system 10 further includes an oxygen-containing gas supply apparatus for supplying an oxygen-containing gas to the fuel cell stack 14 and a coolant supply apparatus for supplying a coolant to the fuel cell stack 14.

Figure 3:
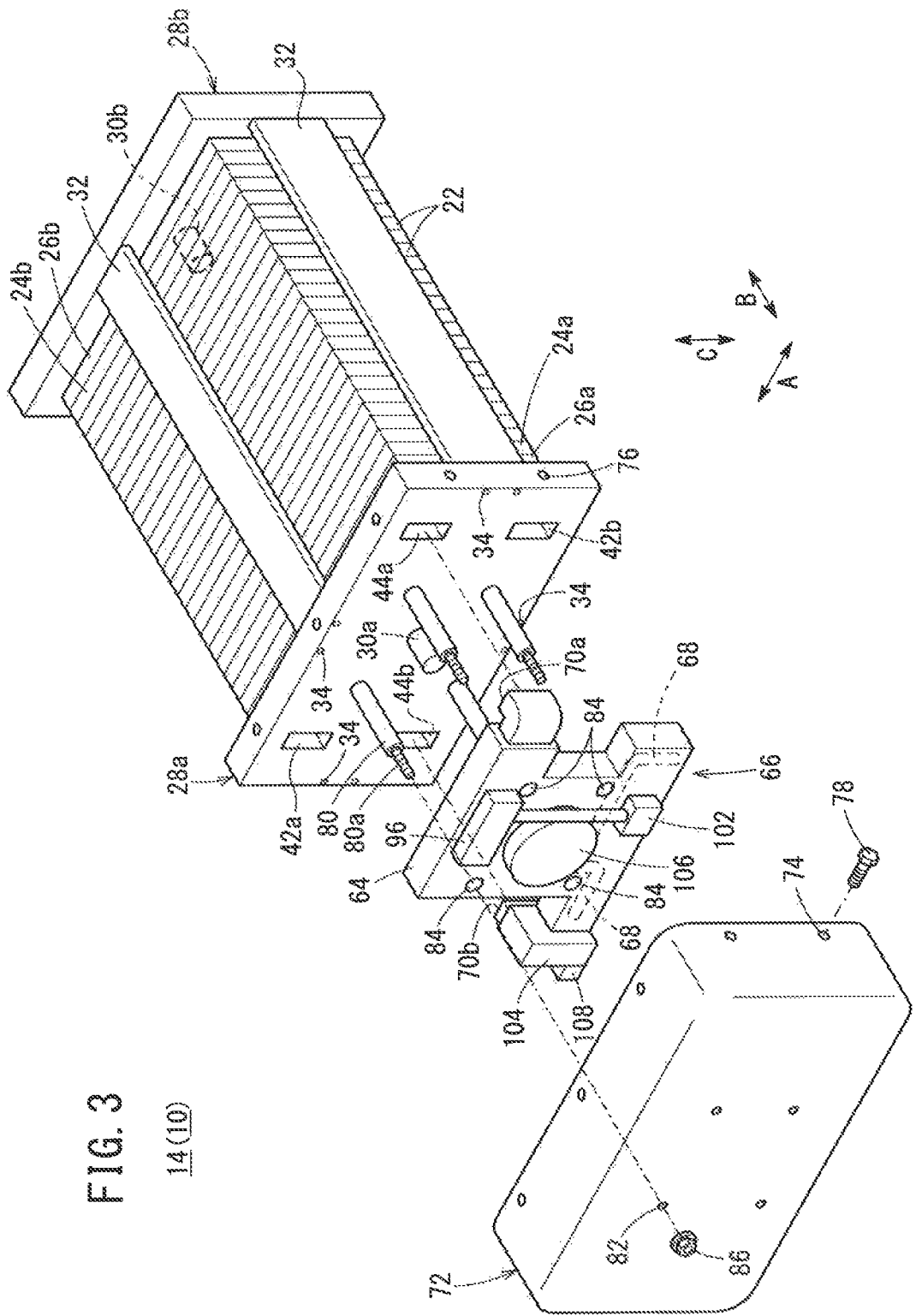
FIG. 3 is a partial exploded perspective view showing a fuel cell stack of the fuel cell system.

As shown in FIG. 3, the fuel cell stack 14 is formed by stacking a plurality of fuel cells 22 in a horizontal direction indicated by an arrow B or in a direction of gravity indicated by an arrow C. At one end of the stacked fuel cells 22 in the stacking direction, a first terminal plate 24a is provided. A first insulating plate 26a is provided outside the first terminal plate 24a, and a first end plate (one of end plates) 28a is provided outside the first insulating plate 26a. At the other end of the stacked fuel cells 22 in the stacking direction, a second terminal plate 24b is provided. A second insulating plate 26b is provided outside the second terminal plate 24b, and a second end plate 28b is provided outside the second insulating plate 26b. In the fuel cell stack 14, the fuel cells 22 are stacked together in the vehicle width direction indicated by the arrow B, and the first end plate 28a and the second end plate 28b are provided at both ends in the vehicle width direction.

A first power output terminal 30a extends from a central position of the laterally-elongated first end plate 28a. The first power output terminal 30a is connected to the first terminal plate 24a. A second power output terminal 30b extends from a central position of the laterally-elongated second end plate 28b. The second power output terminal 30b is connected to the second terminal plate 24b. Both ends of coupling bars 32 are fixed to intermediate positions of the respective sides of the first end plate 28a and the second end plate 28b using screws 34. By the coupling bars 32, a tightening load in the stacking direction indicated by the arrow B is applied to the stacked fuel cells 22.

Figure 4:
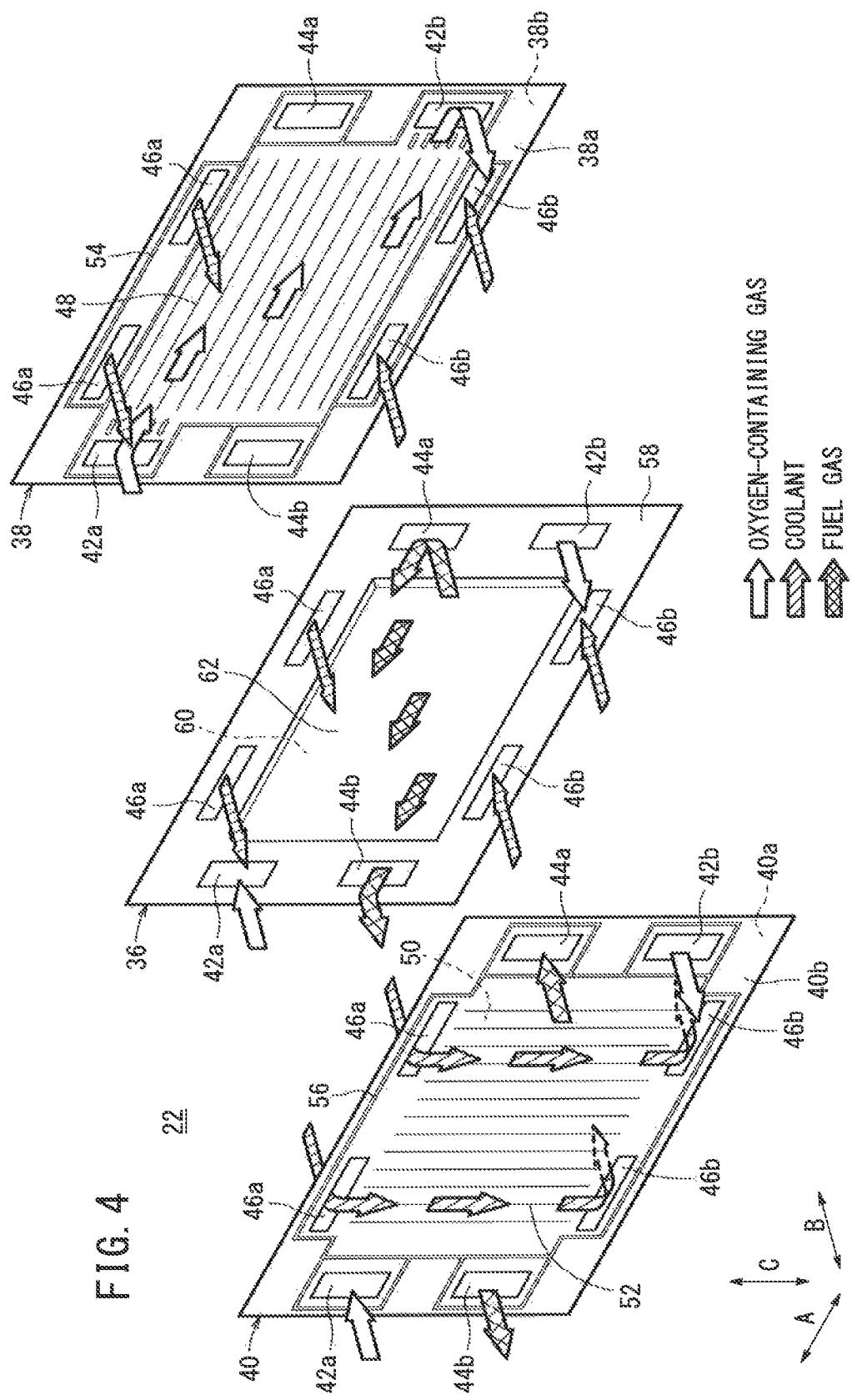
FIG. 4 is an exploded perspective view showing main components of the fuel cells system.

As shown in FIG. 4, the fuel cell 22 has a laterally elongated rectangular shape, and the fuel cell 22 is formed by sandwiching a membrane electrode assembly 36 between a first separator 38 and a second separator 40. For example, the first separator 38 and the second separator 40 are metal separators such as steel plates, stainless steel plates, aluminum plates, or plated steel sheets. Alternatively, the first separator 38 and the second separator 40 are carbon separators.

At one end of the fuel cell 22 in the horizontal direction indicated by an arrow A in FIG. 4, an oxygen-containing gas supply passage 42a and a fuel gas discharge passage 44b are arranged in a vertical direction indicated by an arrow C. The oxygen-containing gas supply passage 42a and the fuel gas discharge passage 44b extend through the fuel cells 22 in the stacking direction indicated by the arrow B. An oxygen-containing gas (hereinafter also referred to as air) is supplied through the oxygen-containing gas supply passage 42a, and a fuel gas such as a hydrogen-containing gas (hereinafter also referred to as the hydrogen gas) is discharged through the fuel gas discharge passage 44b.

At the other end of the fuel cell 22 in the direction indicated by the arrow C, a fuel gas supply passage 44a for supplying the fuel gas and an oxygen-containing gas discharge passage 42b for discharging the oxygen-containing gas are arranged in the direction indicated by the arrow C. The fuel gas supply passage 44a and the oxygen-containing gas discharge passage 42b extend through the fuel cell 22 in the direction indicated by the arrow B.

A pair of coolant supply passages 46a for supplying a coolant are provided at an upper end of the fuel cell 22 in the direction indicated by the arrow C. A pair of coolant discharge passages 46b for discharging the coolant are provided at a lower end of the fuel cell 22 in the direction indicated by the arrow C. Instead of proving the pair of coolant supply passages 46a and the pair of coolant discharge passages 46b, one coolant supply passage 46a and one coolant discharge passage 46b may be provided.

The first separator 38 has an oxygen-containing gas flow field 48 on its surface 38a facing the membrane electrode assembly 36. The oxygen-containing gas flow field 48 is connected to the oxygen-containing gas supply passage 42a and the oxygen-containing gas discharge passage 42b.

The second separator 40 has a fuel gas flow field 50 on its surface 40a facing the membrane electrode assembly 36. The fuel gas flow field 50 is connected to the fuel gas supply passage 44a and the fuel gas discharge passage 44b.

A coolant flow field 52 is formed between a surface 38b of the first separator 38 of one of adjacent fuel cells 22 and a surface 40b of the second separator 40 of the other of the adjacent fuel cells 22. The coolant flow field 52 is connected to the coolant supply passage 46a and the coolant discharge passage 46b.

Seal members 54, 56, are formed integrally with the first separator 38 and the second separator 40, respectively. Alternatively, as the seal members 54, 56, members separate from the first separator 38 and the second separator 40 may be provided on the first separator 38 and the second separator 40, respectively. Each of the seal members 54, 56 is made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

The membrane electrode assembly 36 includes a solid polymer electrolyte membrane 58, and a cathode 60 and an anode 62 sandwiching the solid polymer electrolyte membrane 58. The solid polymer electrolyte membrane 58 is formed by impregnating a thin membrane of perfluorosulfonic acid with water, for example. In the illustrated embodiment, though the surface size of the solid polymer electrolyte membrane 58 is larger than the surface sizes of the cathode 60 and the anode 62, the present invention is not limited in this respect.

Each of the cathode 60 and the anode 62 has a gas diffusion layer such as a carbon paper, and an electrode catalyst layer of porous carbon particles supporting platinum alloy thereon. The carbon particles are deposited uniformly on the surface of the gas diffusion layer. The electrode catalyst layer of the cathode 60 and the electrode catalyst layer of the anode 62 are fixed to both surfaces of the solid polymer electrolyte membrane 58, respectively.

As shown in FIG. 3, the oxygen-containing gas supply passage 42a, the oxygen-containing gas discharge passage 42b, the fuel gas supply passage 44a, and the fuel gas discharge passage 44b are formed in the first end plate 28a.

Though not shown, the coolant supply passages 46a and the coolant discharge passages 46b are formed in the second end plate 28b.

Some of a group of fuel gas system devices (a plurality of fuel gas system devices) 66 are provided on the outer surface (surface opposite to the stack body of the fuel cells 22) of the first end plate 28a using a block member 64. The group of fuel gas system devices 66 attached to the block member 64 at least include any of an ejector 96, a hydrogen pump 106, a liquid-gas separator (tank) 104, a purge valve 108, and a check valve 102 described later. Though not shown, for example, the group of fuel gas system devices 66 may include an injector.

Though not shown, a channel 68 for supplying the fuel gas to and discharging the fuel gas from predetermined devices are formed in the block member 64. Pipes 70a, 70b connected to the fuel gas supply passage 44a and the fuel gas discharge passage 44b are formed integrally with the block member 64. Alternatively, as the pipes 70a, 70b, pipes separate from the block member 64 may be attached to the block member 64. The block member 64 is fixed to the first end plate 28a, e.g., using screws.

A cover member 72 is provided at the first end plate 28a to cover the group of fuel gas system devices 66. The cover member 72 has a box shape having an opening at one end. A plurality of holes 74 are formed along the outer periphery of the cover member 72 around the opening. A predetermined number of screw holes 76, i.e., corresponding to the holes 74 are formed in four sides of the first end plate 28a. Screws 78 are inserted into the holes 74, and front ends of the screws 78 are screwed into the screw holes 76 to fix the cover member 72 to the first end plate 28a (see FIGS. 3 and 5).

Figure 5:
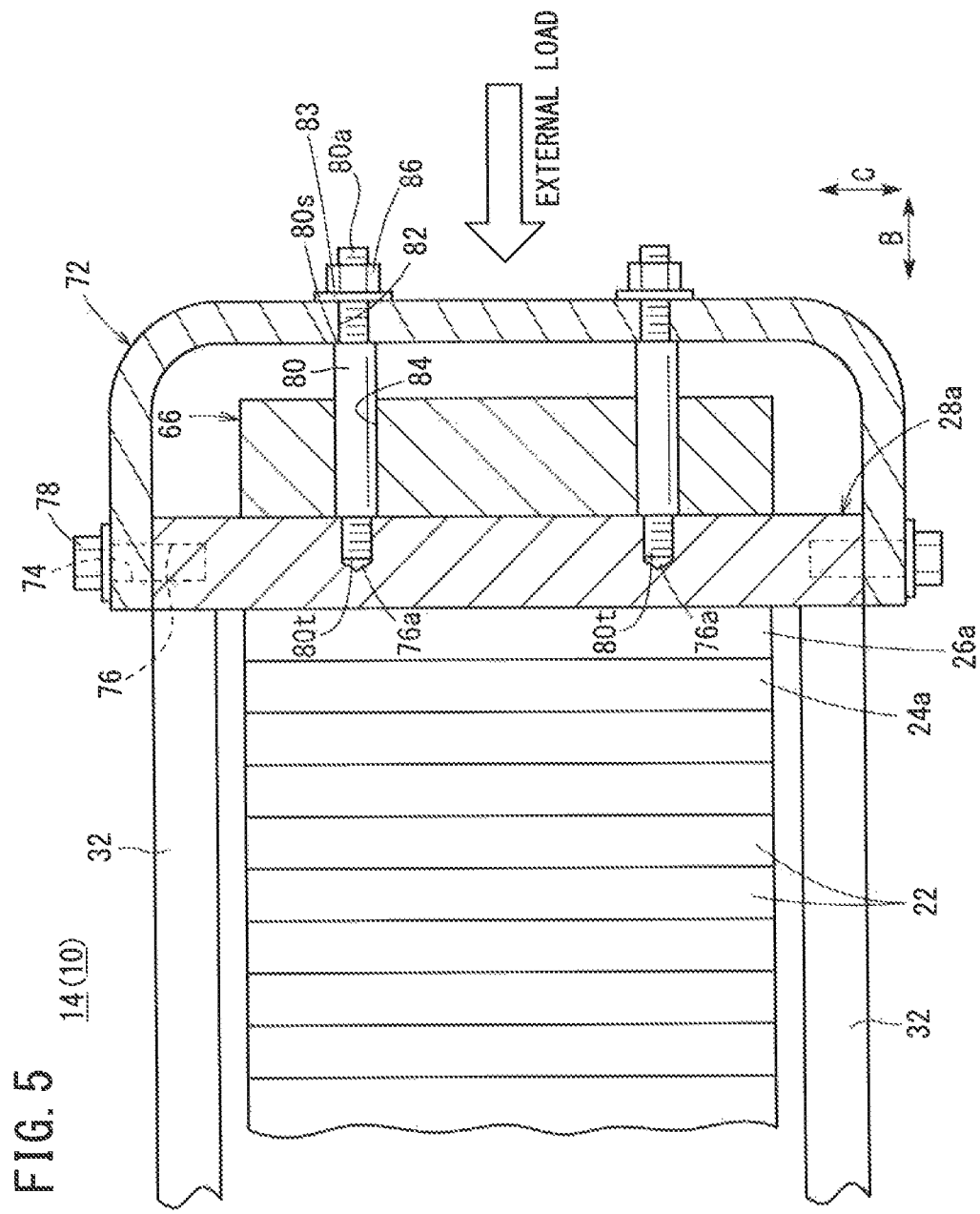
FIG. 5 is a view showing one end of the fuel cell stack.

Support rod members 80 are provided at the first end plate 28a. Each of the support rod members 80 protrudes outward in the stacking direction to support the cover member 72 at its front end. At least two, e.g., four support rod members 80 are provided at positions where the first end plate 28a is deformed significantly, i.e., at positions spaced from the coupling bars 32 when the first end plate 28a is viewed from the stacking direction. As shown in FIG. 5, a small diameter threaded portion 80t is provided at one end of each of the support rod members 80, and the threaded portion 80t is screwed into a screw hole 76a formed in a plate surface of the first end plate 28a. A shoulder portion 80s is provided at the other end of the support rod member 80, and a small diameter threaded portion 80a is formed at the other end of each of the support rod members 80 through the shoulder portion 80s.

Four holes 82 are formed in the cover member 72 at positions corresponding to the support rod members 80. As necessary, four holes (through holes) 84 are formed in the block member 64 at positions corresponding to the support rod members 80. Each of the threaded portions 80a of the support rod members 80 passes through the hole 84 of the block member 64 and the hole 82 at the bottom of the cover member 72, and protrudes to the outside. The threaded portion 80a of the support rod member 80 is screwed into a nut 86 through a washer 83 (see FIG. 5).

As shown in FIG. 2, the fuel gas supply apparatus 20 includes the hydrogen tank 90 for storing high pressure hydrogen. This hydrogen tank 90 is connected to the fuel gas supply passage 44a of the fuel cell stack 14 through a hydrogen supply channel 92. In the hydrogen supply channel 92, a pressure reducing valve 93, a shutoff valve 94, the ejector 96, and a hydrogen circulation channel 98 are provided.

A hydrogen gas is supplied from the hydrogen tank 90 to the ejector 96, and the ejector 96 supplies the hydrogen gas to the fuel cell stack 14 through the hydrogen supply channel 92.

Further, the ejector 96 sucks an exhaust gas containing a hydrogen gas which has not been consumed in the fuel cell stack 14 from the hydrogen circulation channel 98 to supply the exhaust gas as the fuel gas, again to the fuel cell stack 14.

An off gas channel 100 is connected to the fuel gas discharge passage 44b. The hydrogen circulation channel 98 is connected to a position somewhere in the off gas channel 100, and the check valve 102 is provided in the hydrogen circulation channel 98. The gas-liquid separator 104 and the hydrogen pump 106 are provided on the upstream side of the off gas channel 100, and the purge valve 108 is connected to the gas-liquid separator 104.

Operation of the fuel cell system 10 will be described below.

Firstly, when the fuel cell system 10 is operated, as shown in FIG. 2, in the fuel gas supply apparatus 20, the shutoff valve 94 is opened for guiding hydrogen gas from the hydrogen tank 90. Then, after the pressure of the hydrogen gas is reduced by the pressure reducing valve 93, the hydrogen gas is supplied to the hydrogen supply channel 92. This hydrogen gas is supplied through the hydrogen supply channel 92 into the fuel gas supply passage 44a of the fuel cell stack 14.

As shown in FIG. 4, the hydrogen gas flows from the fuel gas supply passage 44a into the fuel gas flow field 50 of the second separator 40. The hydrogen gas moves in the direction indicated by the arrow A, and the hydrogen gas is supplied to the anode 62 of the membrane electrode assembly 36.

In the meanwhile, the oxygen-containing gas (air) from the oxygen-containing gas supply apparatus (not shown) flows into the oxygen-containing gas supply passage 42a of the fuel cell stack 14. The oxygen-containing gas flows from the oxygen-containing gas supply passage 42a into the oxygen-containing gas flow field 48 of the first separator 38. The oxygen-containing gas moves in the direction indicated by the arrow A, and the oxygen-containing gas is supplied to the cathode 60 of the membrane electrode assembly 36.

Thus, in the membrane electrode assembly 36, the hydrogen gas supplied to the anode 62 and the air supplied to the cathode 60 are partially consumed in electrochemical reactions at catalyst layers of the anode 62 and the cathode 60 for generating electricity.

As shown in FIG. 2, the partially-consumed hydrogen gas is discharged from the fuel gas discharge passage 44b into the off gas channel 100, and the hydrogen gas is supplied into the gas-liquid separator 104. After the water in the liquid state is removed from the hydrogen gas at the gas-liquid separator 104, the hydrogen gas is sucked into the ejector 96 through the hydrogen circulation channel 98, and supplied again to the fuel cell stack 14 as the fuel gas. In the meanwhile, as shown in FIG. 4, the partially-consumed air is discharged from the oxygen-containing gas discharge passage 42b to the outside of the fuel cell stack 14.

Further, the coolant is supplied from the coolant supply apparatus (not shown) to the pair of coolant supply passages 46a. After the coolant flows into the coolant flow field 52 between the first separator 38 and the second separator 40, the coolant flows in the direction indicated by the arrow C. After the coolant cools the membrane electrode assembly 36, the coolant flows through the pair of coolant discharge passage 46b, and the coolant is discharged into the coolant circulation system.

In the first embodiment, as shown in FIG. 3, the group of fuel gas system devices 66 are provided on the outer surface of the first end plate 28a using the block member 64. Specifically, the ejector 96, the hydrogen pump 106, the gas-liquid separator 104, the purge valve 108, and the check valve 102 are attached to the block member 64.

Further, the cover member 72 is provided at the first end plate 28a to cover the group of fuel gas system devices 66. Further, the support rod members 80 are screwed into the first end plate 28a. Each of the support rod members 80 protrudes outward in the stacking direction, and supports the cover member 72 at its front end. That is, the cover member 72 covering the group of fuel gas system devices 66 is supported by the front ends of the support rod member 80 provided at the first end plate 28a to protrude in the stacking direction.

Therefore, as shown in FIG. 5, after the external load is applied to the cover members 72, the external load is transmitted to the first end plate 28a through the support rod members 80. Then, the external load is transmitted to the second end plate 28b through the coupling bars 32.

In the structure, it becomes possible to suppress deformation of the cover member 72 suitably. Further, the external load is not directly applied to the fuel gas system devices 66 such as the ejector 96, the hydrogen pump 106, the gas-liquid separator 104, the purge valve 108, and the check valve 102.

Further, the holes 84 are formed in the block member 64, and the threaded portions 80a of the support rod members 80 are inserted into the holes 84 of the block member 64 and the holes 82 of the cover member 72. Therefore, the block member 64 can be fixed by the support rod members 80 at a precise position suitably.

Accordingly, in the first embodiment, with the lightweight and compact structure, it is possible to reliably receive the external road. In particular, it becomes possible to suppress damages of the group of fuel gas system devices 66 as much as possible.

Figure 6:
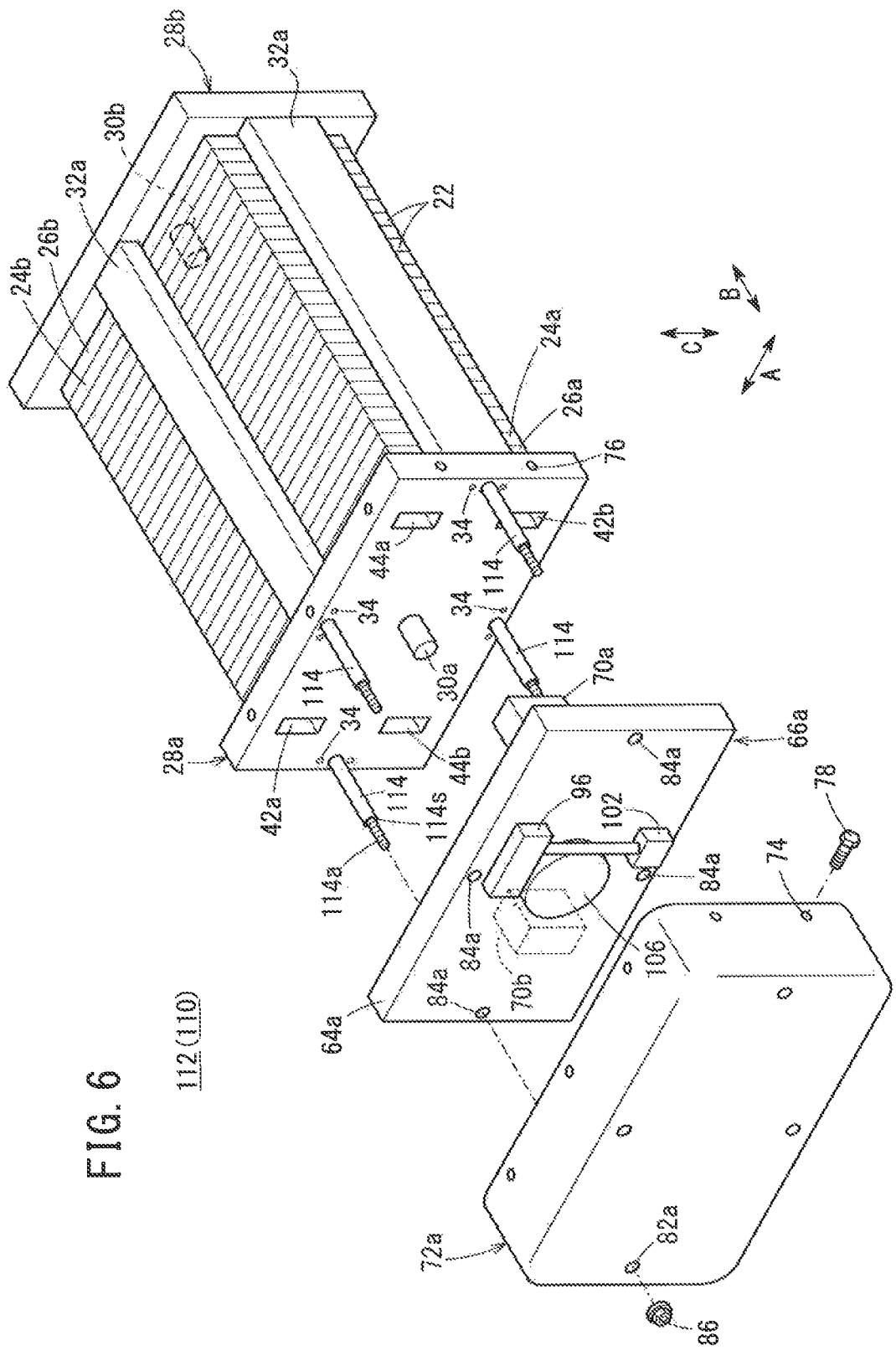
FIG. 6 is a partial exploded perspective view showing a fuel cell stack of a fuel cell system according to a second embodiment of the present invention.

FIG. 6 is a partial exploded perspective view showing a fuel cell stack 112 of a fuel cell system 110 according to a second embodiment of the present invention. The constituent elements that are identical to those of the fuel cell stack 14 of the fuel cell system 10 according to the first embodiment are labeled with the same reference numerals and descriptions thereof will be omitted.

As shown in FIGS. 6 and 7, support rod members 114 as separate components are provided at the first end plate 28a adjacent to respective ends of coupling bars 32a. The support rod members 114 extend outward in the direction indicated by the arrow B. As shown in FIG. 7, a small diameter threaded portion 114t is provided at one end of each of the support rod members 114, and the threaded portion 114t is screwed into a screw hole 76a formed in a plate surface of the first end plate 28a. Preferably, the support rod member 114 includes a portion overlapped with an end of each coupling bar 32a as viewed in the stacking direction. The support rod member 114 may be formed integrally with the coupling bar 32a. Alternatively, as the support rod member 114, a member separate from the coupling bar 32a may be joined to the end of the coupling bar 32a together, e.g., by welding. A shoulder portion 114s is provided at the other end of each of the support rod members 114, and a small diameter threaded portion 114a is formed through the shoulder portion 114s.

A block member 64a is provided for the group of fuel gas system devices 66a, and for example, four holes (through holes) 84a are formed in the block member 64a at positions corresponding to the support rod members 114, i.e., coaxially with the support rod members 114. The threaded portion 114a of each support rod member 114 extends through the hole 84a of the block member 64a and a hole 82a at the bottom of the cover member 72a to protrude to the outside, and the threaded portion 114a of the support rod member 114 is screwed into a nut 86 through a washer 83.

In the second embodiment, with the lightweight and compact structure, it is possible to reliably receive the external load. Thus, the same advantages as in the case of the first embodiment are obtained. For example, in particular, it becomes possible to suppress damages of the group of fuel gas system devices 66a as much as possible.

Further, in the second embodiment, the support rod members 114 are provided adjacent to the ends of the coupling bars 32a of the first end plate 28a. Therefore, as shown in FIG. 7, when an external load is applied to the cover members 72a, the external load is transmitted from the support rod members 114 to the coupling bars 32a. Accordingly, by the external load applied to the cover member 72a, it is possible to further reliably suppress deformation of the first end plate 28a.

While the invention has been particularly shown and described with reference to the preferred embodiments, it will be understood that variations and modifications can be effected thereto by those skilled in the art without departing from the scope of the invention as defined by the appended claims.

What is claimed is:

1. A fuel cell system including a fuel cell stack formed by stacking a plurality of fuel cells in a stacking direction and end plates provided at both ends of the fuel cell stack in the stacking direction, the fuel cells each generating electricity by electrochemical reactions of a fuel gas and an oxygen-containing gas,
wherein a plurality of fuel gas system devices are provided at one of end plates, and a cover member is provided to cover the fuel gas system devices; and
a support rod member is provided at the one of the end plates, and the support rod member protrudes outward in the stacking direction to support the cover member at a front end of the support rod member.

2. The fuel cell system according to claim 1, wherein a plurality of the support rod members are provided; and
a threaded portion is provided at the front end of each of the support rod members, and the threaded portion is screwed into a nut to fix the cover member.

3. The fuel cell system according to claim 1, wherein the fuel gas system devices have a through hole for inserting the support rod member into the through hole.

4. The fuel cell system according to claim 1, further comprising a coupling bar coupled between the end plates for applying a tightening load to the plurality of stacked fuel cells in the stacking direction; and
the support rod member is provided at the end plate adjacent to an end of the coupling bar.

* * * * *